(12) United States Patent
Sawada et al.

(10) Patent No.: US 7,045,575 B2
(45) Date of Patent: May 16, 2006

(54) CATIONIC ELECTRO-DEPOSITION COATING COMPOSITIONS

(75) Inventors: Hidenori Sawada, Kanagawa (JP); Hideki Iijima, Kanagawa (JP); Shigeo Nishiguchi, Kanagawa (JP); Koji Kamikado, Kanagawa (JP)

(73) Assignee: Kansai Paint Co. Ltd., Tokyo (JP)

( * ) Notice: Subject to any disclaimer, the term of this patent is extended or adjusted under 35 U.S.C. 154(b) by 156 days.

(21) Appl. No.: 10/366,605

(22) Filed: Feb. 14, 2003

(65) Prior Publication Data

US 2003/0171473 A1 Sep. 11, 2003

(51) Int. Cl.
*C08F 220/18* (2006.01)

(52) U.S. Cl. .......................... 525/111; 524/408; 525/113

(58) Field of Classification Search ................ 204/504, 204/505; 523/410, 411, 412; 525/111, 113, 525/117, 124; 524/408
See application file for complete search history.

(56) References Cited

U.S. PATENT DOCUMENTS 6,031,028 A * 2/2000 Iino et al. .................. 523/412
6,333,367 B1 12/2001 Kato et al.
6,492,027 B1 * 12/2002 Nishiguchi et al. ......... 428/418

* cited by examiner

*Primary Examiner*—Margaret G. Moore
(74) *Attorney, Agent, or Firm*—Rader, Fishman & Grauer PLLC

(57) ABSTRACT

A cationic electro-deposition coating composition, comprises: Component (A): an amino-containing epoxy resin (A) obtained by adding an amino-containing compound (a-2) to an epoxy resin (a-1) having an epoxy equivalent of from 400 to 3000, Component (B): an amino-containing acrylic resin (B) obtained by adding an amino-containing compound (b-4) to a copolymer resin obtained by radical copolymerization of, as essential components, a polylactone-modified hydroxyl-containing radical copolymerizable monomer (b-1), which is obtained by adding a lactone to a hydroxyl-containing acrylic monomer (b), and glycidyl (meth)acrylate (b-2), and another radical copolymerizable monomer (b-3); and Component (C): a blocked polyisocyanate curing agent (C) as a curing component, the component (A), component (B) and component (C) being added in amounts of 5 to 80 wt %, 5 to 80 wt % and 10 to 40 wt %, respectively, based on the total solid content of the components (A), (B) and (C).

13 Claims, 1 Drawing Sheet

CATIONIC ELECTRO-DEPOSITION COATING COMPOSITIONS

BACKGROUND OF THE INVENTION

1. Technical Field of the Invention

The present invention relates to a cationic resin composition capable of providing a cationic electro-deposition coating having excellent weatherability or weather resistance and corrosion resistance, and good long-term bath stability.

2. Description of Related Art

Cationic electro-deposition coating compositions have been used for wide ranging purposes including automobile undercoating and those having various characteristics have been developed.

As inventions intended to satisfy both weather resistance and corrosion resistance, those having an epoxy resin and an acrylic resin and forming, on a steel plate side, a layer rich in the epoxy resin superior in corrosion resistance and, on the film surface side, the other layer rich in the acrylic resin are disclosed in Japanese Laid-Open Patent Publication Nos. 8-333528, 10-292131, 2000-345394 and 2001-234116.

In the cationic electro-deposition coating, a film is formed by filling an electro-deposition bath of 5 to 300 m$^3$ with a cationic electro-deposition coating, applying a voltage to an automobile body or part which is to be coated, thereby depositing a film thereon, and then baking and drying the film.

Application of a cationic electro-deposition coating requires, in addition to an electro-deposition tank, collecting and water washing equipment, UF equipment and precise filtration equipment. The cationic electro-deposition coating receives many stresses such as mechanical one upon circulation or washing of a collected liquid with water, mechanical stress due to a pressure difference upon passing through the filtration equipment, mechanical stress occurring upon suction of a pump in the electro-deposition tank or delivery, and chemical stress owing to contamination by a degreased liquid or chemical liquid brought in by an automobile body or volatilization of a solvent.

When the amount of substances to be coated decreases, a decline in the loss of a coating occurs, leading to a decrease in the amount of the coating to be supplemented. The remaining coating inevitably receives mechanical or chemical stress as described above for a long period of time. For example, 1 turnover/month (replaced ratio: about 65%/month) means that it takes a month to add, to an electro-deposition tank, a coating in an amount to make up for the loss by line coating.

In an electro-deposition line of 0.1 turnover/month (which line may hereinafter be called "low-speed turnover line"), it takes 10 months for 65% of a coating in an electro-deposition tank to be replaced. The remaining 35% of the coating inevitably undergoes a stress for more than 10 months.

For a cationic electro-deposition coating, long-term stability of the coating is therefore important. Application of a conventional cationic electro-deposition coating, which contains resins drastically different in a solubility parameter, to a low-speed turnover coating line sometimes causes problems such as deterioration in coating finish, clogging upon precise filtration, clogging upon ultrafiltration and disturbance of maintenance such as cleaning by agglomerates appearing in an electro-deposition tank. There is accordingly a demand for the development of a cationic electro-deposition coating excellent in long-term stability of the coating and having both weather resistance and corrosion resistance.

SUMMARY OF THE INVENTION

In view of foregoing, it is an object of the present invention to provide a cationic electro-deposition coating composition capable of forming a film good in both weather resistance and corrosion resistance, and being excellent in adhesion and moisture resistance. It is also an object of the present invention to achieve long-term stability of the coating.

The present inventors have proceeded with an extensive investigation with a view to overcoming the above-described problems and as a result, invented a cationic electro-deposition coating composition excellent in stability of the coating and good in both weatherability or weather resistance and corrosion resistance by mixing an amino-containing epoxy resin (A); an amino-containing acrylic resin (B) available by adding an amino-containing compound to a copolymer resin available by radical copolymerization of a polylactone-modified hydroxyl-containing radical copolymerizable monomer, which is obtained by adding a lactone to a hydroxyl-containing acrylic monomer, and a glycidyl (meth)acrylate as essential components, and another radical copolymerizable monomer; and a blocked polyisocyanate curing agent (C).

The present invention relates to a cationic electro-deposition coating composition that comprises components of an amino-containing epoxy resin (A), an amino-containing acrylic resin (B) and a blocked polyisocyanate curing agent (C). The amino-containing epoxy resin (A) is obtained by adding an amino-containing compound (a-2) to an epoxy resin (a-1) having an epoxy equivalent of from 400 to 3000. The amino-containing acrylic resin (B) is obtained by adding an amino-containing compound (b-4) to a copolymer resin obtained by radical copolymerization of, as essential components, a polylactone-modified hydroxyl-containing radical copolymerizable monomer (b-1), which is obtained by adding a lactone to a hydroxyl-containing acrylic monomer (b) and is represented by the following formula (1) or (2):

(wherein, $R_1$ represents H or an alkyl group, $R_2$ represents any one of $-(CH_2)_n-$, $-(CO)O-(CH_2)_n-$ and $-O-(CO)-(CH_2)_n-$, l stands for an integer of 3 to 10, m stands for an integer of 4 to 8 and n stands for an integer of 1 to 10),

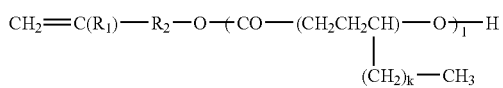

(wherein, $R_1$ represents H or an alkyl group, $R_2$ represents any one of $-(CH_2)_n-$, $-(CO)O-(CH_2)_n-$ and $-O-(CO)-(CH_2)_n-$, l stands for an integer of 3 to 10, k stands for an integer of 0 to 4 and n stands for an integer of 1 to 10), and glycidyl (meth)acrylate (b-2), and another radical copolymerizable monomer (b-3).

The component (C) is a blocked polyisocyanate curing agent (C) as a curing component. The components (A), (B) and (C) are added in amounts of, preferably, 5 to 80 wt %, 5 to 80 wt % and 10 to 40 wt %, respectively, based on the total solid content of the components (A), (B) and (C).

The amino-containing acrylic resin (B) may be obtained by adding the amino-containing compound (b-4) to a resin obtained by radical copolymerization reaction of a mixture of, preferably, 5 to 40 wt % of the polylactone-modified hydroxyl-containing radical copolymerizable acrylic monomer (b-1), which is obtained by adding a lactone to hydroxyethyl (meth)acrylate and is represented by the formula (1) or (2), preferably, 2 to 30 wt % of glycidyl (meth)acrylate and, preferably, 30 to 93 wt % of another radical copolymerizable monomer (b-3), each based on the total solid content of the monomers constituting the amino-containing acrylic resin (B).

DETAILED DESCRIPTION AND PREFERRED EMBODIMENTS OF THE INVENTION

Figure 1:
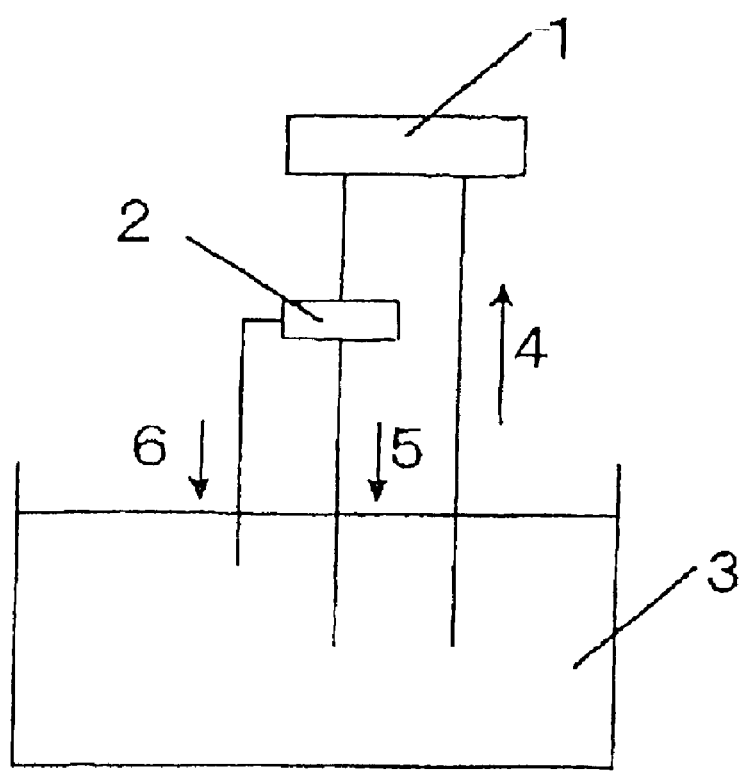
FIG. 1 illustrates a model of a U/F ability testing apparatus for laboratory use.

The present invention relates, as stated above, to a cationic resin composition, excellent in stability of the coating, weather resistance and corrosion resistance, that comprises components of an amino-containing epoxy resin (A), an amino-containing acrylic resin (B) and a blocked polyisocyanate curing agent (C). Each of the components (A), (B) and (C) are described in detail below.

Amino-Containing Epoxy Resin (A)

Examples of the amino-containing epoxy resin include (I) an adduct of a polyepoxy compound and a primary mono- or poly-amine, a secondary mono- or poly-amine or a primary and secondary polyamine mixture (for example, that described in U.S. Pat. No. 3,984,299); (II) an adduct of a polyepoxide compound and a secondary mono- or polyamine having a ketimine-blocked primary amino group; and (III) a reaction product available by etherification of a polyepoxide compound and a hydroxyl compound having a ketimine-blocked primary amino group (for example, that described in Japanese Patent Laid-Open Publication No. 59-43013.

As the polyepoxide compound to be used for the preparation of the above-described amine-added epoxy resin, suited is a compound having, in one molecule thereof, at least two epoxy groups and having a number-average molecular weight of generally at least 200, preferably from 400 to 3,000, more preferably from 800 to 2,000, with that available by the reaction between a polyphenol compound and epichlorohydrin being particularly preferred.

Examples of the polyphenol compound usable for the formation of the polyepoxide compound include bis(4-hydroxyphenyl) -2,2-propane, 4,4-dihydroxybenzophenone, bis(4-hydroxyphenyl) -1,1-ethane, bis(4-hydroxyphenyl)-1,1-isobutane, bis(4-hydroxy-tert-butyl-phenyl)-2,2-propane, bis(2-4-hydroxy -tert-butyl-phenyl)-2,2-propane, bis(2-hydroxynaphthyl)methane, tetra(4-hydroxyphenyl)-1,1,2,2-ethane, 4,4-dihydroxydiphenylsulfone, phenol novolak, cresol novolak.

The polyepoxide compound partially reacted with a polyol, polyether polyol, polyester polyol, polyamidoamine, polycarboxylic acid, or polyisocyanate compound is also usable. Alternatively, a polyepoxide compound obtained by graft polymerization with ε-caprolactone or an acrylic monomer may be used.

As the amino-containing epoxy resin (A), one having a number-average molecular weight ranging preferably from 500 to 5,000, especially from 600 to 4,500, more preferably from 800 to 4,000, an amine value ranging preferably from 40 to 80 mg KOH/g, a primary hydroxyl value ranging preferably from 10 to 200 mg KOH/g and a solubility parameter $\delta$A ranging preferably from 9.5 to 11.5 is suitable. The solubility parameter is a parameter as shown in the following (Note 1).

(Note 1) Solubility parameter: The solubility parameter (SP value) represents a measure of an intermolecular action between liquid molecules. In the present invention, the SP value is calculated in accordance with the following equation (1):

$$SP = SP_1 \times fw_1 + SP_2 \times fw_2 + \ldots + SP_n \times fw_n \tag{1}$$

wherein, $SP_1$, $SP_2$, ..., and $SP_n$ represents the SP of the respective monomers, and $fw_1$, $fw_2$, ..., and $fw_n$ represent weight fractions of the respective monomers based on a total weight of the monomers. The SPs of polymerizable monomers are written briefly in "J. Paint Technology, 42, 176 (1970)". The monomer not listed in the above literature, reference may be made to a catalog issued by a manufacturer.

The above-described amino-containing epoxy resin (A) can form a film excellent in weatherability and corrosion resistance by being added, together with an amino-containing acrylic resin (B), to a cationic electro-deposition coating.

Amino-Containing Acrylic Resin (B):

The amino-containing acrylic resin (B) to be used in the present invention is prepared by obtaining a copolymer resin by the radical copolymerization of, as essential components, a polylactone-modified hydroxyl-containing radical copolymerizable monomer (b-1), which is obtained by adding a lactone to a hydroxyl-containing monomer (b) and is represented by the following formula (1) or (2):

(wherein, $R_1$ represents H or an alkyl group, $R_2$ represents any one of $-(CH_2)_n-$, $-(CO)O-(CH_2)_n-$ and $-O-(CO)-(CH_2)_n-$, l stands for an integer of 3 to 10, m stands for an integer of 4 to 8 and n stands for an integer of 1 to 10),

(wherein, $R_1$ represents H or an alkyl group, $R_2$ represents any one of $-(CH_2)_n-$, $-(CO)O-(CH_2)_n-$ and $-O-(CO)-(CH_2)_n-$, l stands for an integer of 3 to 10, k stands for an integer of 0 to 4 and n stands for an integer of 1 to 10), and glycidyl (meth)acrylate (b-2), and another radical copolymerizable monomer (b-3); and then adding an amino-containing compound (b-4) to the resulting copolymer resin.

Examples of the hydroxyl-containing acrylic monomer (b) include 2-hydroxyethyl (meth)acrylate, 2-hydroxypropyl (meth)acrylate, 4-hydroxybutyl (meth)acrylate and 2-hydroxyethyl (meth)acrylate. Addition of a lactone thereto can yield a polylactone-modified hydroxyl-containing radical copolymerizable monomer (b-1) represented by the formula (1) or (2).

The addition products of 2-hydroxyethyl (meth)acrylate and caprolactone include, for example, "PLACCEL FA-3" and "PLACCEL FM-3" (each, trade name; product of Daicel Chemical Industries, Ltd.). They may be used either singly or in combination.

The content of the polylactone-modified hydroxyl-containing radical copolymerizable monomer (b-1) ranges preferably from 5 to 40 wt %, more preferably from 10 to 35 wt %, based on the total amount of the monomer components constituting the resin (B).

Contents of the polylactone-modified hydroxyl-containing radical copolymerizable monomer (b-1) exceeding 40 wt % tend to soften the resin (B), thereby deteriorating the corrosion resistance of the electrodeposited film, although it may be used for the present invention. Contents of the polylactone-modified hydroxyl-containing radical copolymerizable monomer (b-1) less than 5 wt %, on the other hand, tend to lower the compatibility between the resin (B) and the amino-containing epoxy resin (A), thereby deteriorating the stability of the coating and also the coating finish (film appearance), although it may be used for the present invention.

In order to impart the monomer with water solubility, an active-hydrogen-containing amine compound may be added to glycidyl (meth)acrylate (b-2) or they may be subjected to ring-opening copolymerization to add the active-hydrogen-containing amine compound to the terminal of glycidyl (meth)acrylate. The content of glycidyl (meth)acrylate (b-2) ranges preferably from 2 to 30 wt %, further preferably from 5 to 25 wt % based on the total amount of the monomer components constituting the resin (B).

When the content of glycidyl (meth)acrylate (b-2) exceeds 30 wt %, a film formed using a cationic electrodeposition coating containing the resulting resin (B) tend to have deteriorated weather resistance, although it may be used. The content of glycidyl (meth)acrylate (b-2) less than 2 wt %, on the other hand, tend to deteriorate the water dispersibility of the resin (B), although it may be used for the present invention.

As the another radical copolymerizable monomer (b-3), hydroxyl-containing acrylic monomers (b) similar to those described above are usable. Examples include 2-hydroxyethyl (meth)acrylate, 2-hydroxypropyl (meth)acrylate, 4-hydroxybutyl (meth)acrylate and 2-hydroxyethyl (meth)acrylate may be used. Amino-containing acrylic monomers may also be used. Examples include N,N-dimethylaminoethyl (meth)acrylate, N,N-diethylaminoethyl (meth)acrylate, N,N-dimethylaminopropyl (meth)acrylate, N,N-di-t-butylaminoethyl (meth)acrylate, and N,N-dimethylaminopropyl (meth)acrylamide.

In addition, methyl (meth)acrylate, ethyl (meth)acrylate, n-propyl (meth)acrylate, isopropyl (meth)acrylate, n-butyl (meth)acrylate, isobutyl (meth)acrylate, t-butyl (meth)acrylate, cyclohexyl (meth)acrylate, 2-ethylhexyl (meth)acrylate, styrene, vinyl toluene and α-methylstyrene may be used. Such a monomer (b-3) may be used in an amount of from 30 to 93 parts by weight, based on the total amount of the monomer components constituting the resin (B). Amounts less than 30 parts by weight tend to deteriorate corrosion resistance and weatherability, while those exceeding 90 parts by weight tend to deteriorate compatibility with the amino-containing resin and water dispersibility. However, the amount less than 30 parts by weight or exceeding 90 parts by weight may be used for the present invention.

Examples of the organic solvent to be used for radical copolymerization include aromatic hydrocarbon solvents such as toluene and xylene, ketone solvents such as methyl isobutyl ketone and cyclohexanone, and alcoholic solvents such as n-butanol, ethyl cellosolve, butyl cellosolve, methoxypropanol, and diethylene glycol monobutyl ether. As the organic solvent, they may be used either singly or as a mixture of a plurality of them.

The radical copolymerization reaction can usually be carried out by reacting the above-described monomer components in the above-described organic solvent maintained at preferably from about 50° C. to 300° C., more preferably from about 60° C. to 250° C. for about preferably one hour to 24 hours, more preferably from about 2 hours to 10 hours under an inert gas such as nitrogen gas.

Examples of the amino-containing compound (b-4) to be added to impart water dispersibility include primary mono- or polyamines, secondary mono- or polyamines, a mixture of primary and secondary polyamines, secondary mono- or polyamines having a ketimine-blocked primary amino group, and hydroxyl compounds having a ketimine-blocked primary amino group. More specifically, use of diethylamine, diethanolamine or ketimine-blocked diethylenetriamine is preferred.

The amino-containing acrylic resin (B) has a number-average molecular weight ranging preferably from 1,000 to 50,000, more preferably from 2,000 to 20,000. When the number-average molecular weight is less than 1,000, the emulsion tend to have impaired stability, while when it exceeds 50,000, the smoothness on the film surface tend to be impaired. The number-average molecular weight outside the above-described range is therefore not preferred, even though the amino-containing acrylic resin (B) having a number average moleclular weight less than 1,000 or exceeding 50,000 may be used for the present invention.

The amino-containing acrylic resin (B) having an amine value ranging preferably from 10 to 125 mg KOH/g, a hydroxyl value ranging preferably from 10 to 300 mg KOH/g and a solubility parameter $\delta_A$ (Note 1) ranging preferably from 9.5 to 11.5 are suited in the present invention.

When an amine value exceeds 125 mg KOH/g, hydrophilic properties of the resin (B) tend to increase, resulting relatively in a deterioration in the performances of the electrodeposited film such as weather resistance and corrosion resistance, although an amine value exceeding 125 mg KOH/g may be used for the present invention. Amine values less than 10 mg KOH/g, on the other hand, tend to cause a drastic worsening in water dispersibility of an emulsion of the resin (A), although an amine value less than 10 mg KOH/g may be used for the present invention.

When the hydroxyl value exceeds 300 mg KOH/g, hydrophilic properties of the resin (B) tend to increase, resulting relatively in a deterioration in the corrosion resistance of the electrodeposited film. The hydroxyl value less than 10 mg KOH/g, on the other hand, tend to lower water dispersibility and a cross-linking density, leading relatively to a deterioration in the film performance, although the hydroxyl value less than 10 mg KOH/g may be used for the present invention.

When the solubility parameter $\delta_A$ is less than 9.5, the compatibility with the amino-containing epoxy resin tend to lower. Solubility parameters exceeding 11.5, on the other hand, tend to lead to a deterioration in weatherability, although the solubility parameter $\delta_A$ less than 9.5 may be used for the present invention.

In the present invention, a difference in the SP value between the amino-containing epoxy resin (A) and the amino-containing acrylic resin (B) is preferably 0 to 0.7. The difference of the SP value exceeding 0.7 may cause a deterioration in the long-term stability of the coating, or cause a layer separation of the film containing both resins, thereby deteriorating adhesion or moisture resistance, even though the SP value between the amino-containing epoxy resin (A) and the amino-containing acrylic resin (B) may be outside of the range.

Blocked Polyisocyanate Curing Agent (C)

The blocked polyisocyanate curing agent (C) is a product of addition reaction between a polyisocyanate compound and an isocyanate blocking agent in a stoichiometric ratio. As the polyisocyanate compound, conventional ones can be used. Examples include aromatic, aliphatic or alicyclic polyisocyanate compounds such as trylene diisocyanate, xylylene diisocyanate, phenylene diisocyanate, diphenylmethane-2,4',-diisocyanate, diphenylmethane-4,4'-diisocyanate (usually called "MDI"), crude MDEi(MDI), bis(isocyanatomethyl)cyclohexane, tetramethylene diisocyanate, hexamethylene diisocyanate, methylene diisocyanate and isophorone diisocyanate; cyclic polymers of these polyisocyanate compounds and isocyanate-biuret; and terminal-isocyanate-containing compounds available by reacting an excess amount of such an isocyanate compound with a low-molecular active-hydrogen-containing compound such as ethylene glycol, propylene glycol, trimethylolpropane, hexanetriol or castor oil. These polyisocyanate compounds may be used either singly or in combination.

The above-described isocyanate blocking agent is added to the isocyanate group of a polyisocyanate compound to block it. The blocked polyisocyanate compound prepared by the addition reaction is stable at normal temperature, but when heated at a film baking temperature (usually, about 100 to 200° C.), it desirably causes dissociation of the blocking agent and regenerates the free isocyanate group.

Examples of the blocking agent capable of satisfying the above requirements include lactam compounds such as ε-caprolactam and γ-caprolactam; oxime compounds such as methyl ethyl ketoxime and cyclohexanone oxime; phenol compounds such as phenol, para-t-butylphenol and cresol; aliphatic alcohols such as n-butanol and 2-ethylhexanol; aromatic alkyl alcohols such as phenylcarbinol and methylphenylcarbinol; and ether alcohol compounds such as ethylene glycol monobutyl ether and diethylene glycol monoethyl ether.

As well as these blocking agents, blocked polyisocyanate crosslinking agents (II) containing, as a blocking agent, a diol containing two hydroxyl groups different in reactivity and having a molecular weight of 76 to 150 or a carboxyl-containing diol having a molecular weight of 106 to 500 may be used.

The above-described diol contains two hydroxyl groups different in reactivity, for example, a primary hydroxyl group and a secondary hydroxyl group, a primary hydroxyl group and a tertiary hydroxyl group, or a secondary hydroxyl group and a tertiary hydroxyl group; and has a molecular weight of, 76 to 150. Examples of the diol having two hydroxyl groups different in reactivity include propylene glycol, dipropylene glycol, 1,3-butanediol, 1,2-butanediol, 3-methyl-1,2-butanediol, 1,2-pentanediol, 1,4-pentanediol, 3-methyl -4,3-pentanediol, 3-methyl-4,5-pentanediol, 2,2,4-trimethyl-1,3-pentanediol, 1,5-hexanediol and 1,4-hexanediol.

Of these, propylene glycol is preferred from the viewpoints of the reactivity of the blocked polyisocyanate, a reduction in heating loss, and storage stability of the resulting coating. The reaction with an isocyanate group usually starts first with the hydroxyl group having a higher reactivity, thereby blocking the isocyanate group.

The above-described carboxyl-containing diol embraces a carboxyl-containing diol having a molecular weight of 106 to 500. It is able to have improved low-temperature dissociation property and in turn, improved low-temperature curing property, by having, in the molecule thereof, a carboxyl group. Particularly, use of an organotin compound as a curing catalyst brings about a drastic improvement in the low-temperature curing property.

Examples of the carboxyl-containing diol include 2,2-dimethylolpropionic acid, 2,2-dimethylolbutanoic acid, dimethylolvaleric acid and glyceric acid.

The cationic resin composition of the cationic electro-deposition coating contains the amino-containing epoxy resin (A), amino-containing acrylic resin (B), and blocked polyisocyanate curing agent (C) and it preferably contains them in amounts of 5 to 80 wt %, 5 to 80 wt % and 10 to 40 wt %, respectively, each based on the total solid content of the resin (A), resin (B) and curing agent (C).

Neutralization and dispersion of the cationic resin composition are conducted as follows. After the amino-containing epoxy resin (A), amino-containing acrylic resin (B) and blocked polyisocyanate curing agent (C) are mixed sufficiently, a dissolved varnish thus obtained is added with one or more of neutralizers selected from formic acid, acetic acid, lactic acid, propionic acid, citric acid, malic acid and sulfamic acid. The resulting mixture is dispersed in water to yield an emulsion for a cationic electro-deposition coating.

Amounts of the amino-containing epoxy resin (A) less than 5 wt % tend to lower corrosion resistance, while those exceeding 80 wt % tend to lower weatherability. However, amount of the amino-containing epoxy resin (A) or exceeding 80 wt % may be used for the present invention. Amounts of the amino-containing acrylic resin (B) less than 5 wt % tend to lower weatherability, while those exceeding 80 wt % tend to lower corrosion resistance. However, amounts of the amino-containing acrylic resin (B) or exceeding 80 wt % may be used for the present invention. Amounts of the blocked polyisocyanate curing agent (C) less than 10 wt % tend to lower the curing property, while those exceeding 40 wt % tend to cause a deterioration in the storage stability of the coating although amounts of the blocked plyisocyanate curing agent (C) less than 10 wt % or exceeding 40 wt % may be used for the present invention.

Addition of acetic acid and/or formic acid as the neutralizer is preferred, because it brings about excellent coating finish, throwing power of electrolytic coating, low-temperature curing property and stability of the coating.

It is preferred to add, to the cationic resin composition, a bismuth compound as a rust preventive material. Although no particular limitation is imposed on the bismuth compound, bismuth oxide, bismuth hydroxide, basic bismuth carbonate, bismuth nitrate and bismuth silicate can be given as examples. Of these, bismuth hydroxide is preferred.

Alternatively, a bismuth salt of an (oxy)organic acid prepared by reacting the above-described bismuth compound with at least two organic acids, at least one of which is an aliphatic hydroxycarboxylic acid, may be used.

Examples of the aliphatic carboxylic acid used in the preparation of the bismuth salt of an (oxy)organic acid may include glycolic acid, glyceric acid, lactic acid, dimethylolpropionic acid, dimethylolbutyric acid, dimethylolvaleric acid, tartaric acid, malic acid, hydroxymalonic acid, dihydroxysuccinic acid, trihydroxysuccinic acid, methylmalonic acid, benzoic acid and citric acid.

The content of the bismuth compound in the cationic electro-deposition coating is not limited precisely, but can be varied widely depending on the performance that the coating is required to have. The content of the bismuth compound is adjusted within a range of 0.01 to 10 parts by weight, preferably from 0.05 to 5 parts by weight, based on 100 parts by weight of the total solid content of the cationic resin composition of the cationic electro-deposition coating composition including the amino-containing epoxy resin (A), amino-containing acrylic resin (B) and blocked polyisocyanate curing agent (C).

The cationic electro-deposition coating composition may contain, as a curing catalyst, a tin compound in addition to the above-described components. Examples of the tin compound include organotin compounds such as dibutyltin oxide and dioctyltin oxide; and aliphatic or aromatic carboxylates of a dialkyltin such as dibutyltin dilaurate, dioctyltin dilaurate, dibutyltin diacetate, dioctyltin benzoate, dibutyltin benzoate, dioctyltin dibenzoate, and dibutyltin dibenzoate. Of these, aromatic carboxylates of a dialkyltin are preferred from the viewpoint of low-temperature curing property.

The content of the tin compound is not limited precisely, but can be varied widely depending on the performance that the resulting cationic electro-deposition coating is required to have. The tin content is usually adjusted to fall within a range of from preferably 0.01 to 8.0 wt %, more preferably from 0.05 to 5.0 wt %, based on 100 wt % of the solid content of the cationic resin composition in the cationic electro-deposition coating composition.

In addition, the cationic resin composition of the present invention may further contain a coloring pigment, body pigment, organic solvent, pigment dispersant and/or surface adjuster as needed.

The cationic electro-deposition coating composition composed of the cationic resin composition can be applied onto the surface of a desired base material by cationic electro-deposition coating method. In the ordinarily-employed electro-deposition coating method, a coating composition is diluted with deionized water or the like to give a solid content concentration of about 5.0 to 40 wt %, followed by control of the pH within a range of 5.5 to 9.0 to prepare an electro-deposition coating bath. In the resulting coating bath controlled to have a bath temperature of from 15 to 35° C., electro-deposition coating can be performed under a load voltage of 100 to 400V.

Although there is no particular limitation imposed on the thickness of the film formed by cationic electro-deposition coating using the composition, it preferably ranges from 10 to 40 μm in terms of the cured film. Baking temperature of a film usually ranges preferably from 120 to 200° C. on the surface of a substance to be coated, more preferably 140 to 180° C. Baking is performed for preferably 5 to 60 minutes, more preferably about 10 to 30 minutes. It is preferred to maintain the baking temperature on the surface of the substance for these minutes.

The cationic resin composition of the present invention can be used for, as well as cationic electro-deposition coating, electrostatic coating as a solvent type coating or roll coating as an anticorrosive primer of a steel plate. It is also usable as a two-part room-temperature curing coating or adhesive instead of a blocked isocyanate curing agent.

EXAMPLES

The present invention will hereinafter be described in further detail by Examples. It should however be borne in mind that the present invention is not limited to or by them. All the designations of "part" or "parts" and "%" mean part or parts by weight and wt %, respectively.

Preparation of an Amino-Containing Epoxy Resin

Preparation Example 1

After the addition of 1143 g of "EPICOAT 828EL" (epoxy resin, trade name; product of Japan Epoxy Resins Co., Ltd., epoxy equivalent: 190, molecular weight: 380), 457 g of Bisphenol A and 0.2 g of dimethylbenzylamine, the resulting mixture was reacted at 130° C. to give an epoxy equivalent of 800. The reaction mixture was then diluted with 100 g of butyl cellosolve.

To the diluted mixture were added 160 g of diethanolamine and 65 g of ketimine-blocked diethylenetriamine, followed by reaction at 120° C. for 4 hours. To the reaction mixture was added 355 g of butyl cellosolve, whereby an amino-containing epoxy resin (A-1) having an amine value of 62 mg KOH/g, and a solid content of about 80% was obtained.

Preparation Example 2

Preparation of an Acrylic Resin ($a_1$) for Modification

Polymerizable unsaturated monomers and organic solvent to be used in this Example were all fed with a nitrogen gas for 1 hour for deaeration (deoxidization) prior to use.

In a reaction container equipped with a thermometer, a thermostat, an agitator, a reflux condenser and a dropping funnel, 30 g of propylene glycol monomethyl ether was charged as a solvent. While feeding a nitrogen gas, the solvent was heated to 115° C. Then, a mixture containing, as polymerizable unsaturated monomers, 10 g of styrene, 20 g of methyl methacrylate, 36 g of n-butyl methacrylate, 30 g of 2-hydroxyethyl methacrylate, and 4 g of acrylic acid and, as a radical polymerization initiator, 7 g of 2,2'-azobis (20methylbutylonitrile) was added dropwise over 3 hours. After the reaction mixture was allowed to stand at 115° C. for 1 hour, 0.5 part of 2,2'-azobis(2-methylbutylonitrile) and 5 g of propylene glycol monomethyl ether were added dropwise over 1 hour. The reaction mixture was allowed to stand at 115° C. for 1 hour to yield an acrylic resin ($a_1$) for modification having a solid content of about 75%. The resulting acrylic resin ($a_1$) for modification was found to have a number-average molecular weight of about 3000.

Preparation Example 3

After the addition of 1018 g of "EPICOAT 828EL" (epoxy resin, trade name; product of Japan Epoxy Resins Co., Ltd., epoxy equivalent: 190, molecular weight: 380), 382 g of Bisphenol A and 0.2 g of dimethylbenzylamine, the resulting mixture was reacted at 130° C. to give an epoxy equivalent of 700. The reaction mixture was then diluted with 100 g of butyl cellosolve.

To the diluted mixture were added 280 g of the acrylic resin ($a_1$) for modification obtained in Preparation Example 2, 153 g of diethanolamine and 65 g of a ketimine-blocked diethylenetriamine, followed by reaction at 120° C. for 4 hours. To the reaction mixture was added 288 g of butyl cellosolve, whereby an amino-containing epoxy resin (A-2) having an amine value of 60 mg KOH/g and a solid content of 80% was obtained.

The compositions of the resulting amino-containing epoxy resins are shown in Table 1.

TABLE 1

|  | Preparation Example 1 | Preparation Example 3 |
| --- | --- | --- |
| Amino-containing epoxy resin | (A-1) | (A-2) |
| "EPICOAT 828EL" | 1143 | 1018 |
| Bisphenol A | 457 | 382 |
| Dimethylbenzylamine | 0.2 | 0.2 |
| Butyl cellosolve | 100 | 100 |
| Acrylic resin ($a_1$) for modification | 0 | 280 |
| Diethanolamine | 160 | 153 |
| Ketimine-blocked diethylenetriamine | 65 | 65 |
| Butyl cellosolve | 355 | 288 |
| Solid content (%) | 80 | 80 |
| Amine value mg KOH/g | 61.8 | 59.7 |
| Primary hydroxyl value mg KOH/g | 93.7 | 89.4 |

Preparation of Amino-Containing Acrylic Resin

Preparation Example 4 (For Example)

Polymerizable unsaturated monomers and organic solvent to be used in this Example were all fed with a nitrogen gas for 1 hour for deaeration (deoxidization) prior to use.

In a reaction container equipped with a thermometer, a thermostat, an agitator, a reflux condenser and a dropping funnel were charged 10 parts of butyl cellosolve and 20 parts of methyl isobutyl ketone as solvents. While feeding a nitrogen gas, the solvents were heated to 115° C.

A mixture containing, as polymerizable unsaturated monomers, 10 parts of styrene, 40 parts of methyl methacrylate, 10 parts of n-butyl methacrylate, 5 parts of 2-hydroxyethyl methacrylate, 20 parts of "FM-6" (polycaprolactone-modified hydroxyethyl methacrylate, trade name; product of Daicel Chemical Industry, number-average molecular weight: 814), and 15 parts of glycidyl methacrylate and, as a radical polymerization initiator, 5 parts of 2,2'-azobis(2-methylbutylonitrile) was added dropwise over 3 hours.

After the reaction mixture was allowed to stand at 115° C. for 1 hour, 0.5 part of 2,2'-azobis(2-methylbutylonitrile) and 5 parts of methyl isobutyl ketone were added dropwise over 1 hour. The reaction mixture was allowed to stand at 115° C. for 1 hour to yield an acrylic copolymer solution.

The resulting acrylic copolymer was found to have a number-average molecular weight of about 4000. The acrylic copolymer solution was maintained at 115° C. and 10.8 parts of diethanolamine was added thereto. The resulting mixture was then heated to 120° C. After the reaction mixture was kept at the same temperature for 5 hours, it was cooled, whereby an amino-containing acrylic resin No. 1 having a solid content of about 75% was obtained.

Preparation Examples 5 and 6 (For Examples)

In a similar manner to Preparation Example 4 except for the compositions as shown in Table 2, amino-containing acrylic resins Nos. 2 and 3 were obtained.

Preparation Examples 7 and 8 (For Examples)

In a similar manner to Preparation Example 4 except for the compositions as shown in Table 2, amino-containing acrylic resins Nos. 4 and 5 were obtained.

Preparation Example 9

Preparation of Blocked Polyisocyanate Curing Agent (alicyclic)

To 222 g of isophorone diisocyanate and 44 g of methyl isobutyl ketone, was added dropwise 174 g of methyl ethyl ketoxime in portions at 50° C., whereby a blocked polyisocyanate curing agent No. 1 having a solid content of 90% was obtained.

Preparation Example 10

Preparation of Blocked Polyisocyanate Curing Agent (aromatic)

After the addition of 270 g of "M-200" (trade name of crude MDI; product of Mitsui Kagaku) and 60 g of methyl isobutyl ketone, the resulting mixture was heated to 70° C. After 273 g of diethylene glycol monoethyl ether was added in portions, the mixture was heated to 90° C. While maintaining the temperature, sampling was conducted periodically. Disappearance of the absorption of an unreacted isocyanate was confirmed by infrared absorption spectrum, whereby a blocked polyisocyanate curing agent No. 2 having a solid content of 90% was obtained.

Preparation Example 11

Preparation of Emulsion No. 1

A mixture of 37.5 parts of the amino-containing epoxy resin (A-1) (solid content: 30 parts) obtained in Preparation Example 1 and having a solid content of 80%, 53.3 parts

TABLE 2

| Amino-containing acrylic resin | Preparation Example 4 No. 1 | Preparation Example 5 No. 2 | Preparation Example 6 No. 3 | Preparation Example 7 No. 4 | Preparation Example 8 No. 5 |
| --- | --- | --- | --- | --- | --- |
| Butyl cellosolve | 10 | 10 | 10 | 10 | 10 |
| Methyl isobutyl ketone | 20 | 20 | 20 | 20 | 20 |
| Styrene | 10 | 10 | 20 | 20 | 10 |
| Methyl methacrylate | 40 | 36 | 40 | 45 | 40 |
| n-Butyl methacrylate | 10 | 10 | 10 | 10 | 15 |
| 2-Hydroxyethyl methacrylate | 5 | 5 | 0 | 10 | 0 |
| FM-6 (Note 2) | 20 | | | | |
| FM-3 (Note 3) | | 30 | | | |
| FA-5 (Note 4) | | | 10 | | |
| FA-1 (Note 5) | | | | | 20 |
| Glycidyl methacrylate | 15 | 9 | 20 | 15 | 15 |
| 2,2'-azobis(2-methylbutylonitrile) | 5 | 7 | 3 | 5 | 5 |
| 2,2'-azobis(2-methylbutylonitrile) | 0.5 | 0.5 | 0.5 | 0.5 | 0.5 |
| Methyl isobutyl ketone | 5 | 5 | 5 | 5 | 5 |
| Diethanolamine | 10.8 | 5 | 14.5 | 10.8 | 10.8 |
| Ketimine-blocked diethylenetriamine | | 4 | | | |
| Total | 151.3 | 151.5 | 153 | 151.3 | 151.3 |
| Solid content | 75.1 | 75.4 | 74.7 | 75.1 | 75.1 |
| Amine value mg KOH/g | 50.8 | 38.1 | 67.8 | 50.8 | 50.8 |
| Primary hydroxyl value mg KOH/g | 132.7 | 96.8 | 142.7 | 139.6 | 144.5 |

(Note 2)
"FM-6" (trade name of polycaprolactone-modified hydroxyethyl methacrylate, product of Daicel Chemical Industries, Ltd., number-average molecular weight: 814)
(Note 3)
"FM-3" (trade name of polycaprolactone-modified hydroxyethyl methacrylate, product of Daicel Chemical Industries, Ltd., number-average molecular weight: 472)
(Note 4)
"FA-5" (trade name of polycaprolactone-modified hydroxyethyl acrylate, product of Daicel Chemical Industries, Ltd., number-average molecular weight: 686)
(Note 5)
"FA-1" (trade name of polycaprolactone-modified hydroxyethyl acrylate, product of Daicel Chemical Industries, Ltd., number-average molecular weight: 230)

(solid content: 40 parts) of the amino-containing acrylic resin No. 1 obtained in Preparation Example 4 and having a solid content of 75%, 33.3 parts (solid content: 30 parts) of the blocked polyisocyanate curing agent No. 1 having a solid content of 90% and 8.2 parts of formic acid having a solid content of 10% was stirred uniformly. To the reaction mixture, 163.4 parts of deionized water was added dropwise over about 15 minutes while vigorously stirring, whereby a cationic electro-deposition coating emulsion No. 1 having a solid content of 34% was obtained.

Preparation Examples 12 to 16

Preparation of Emulsions Nos. 2 to 6

Emulsions Nos. 2 to 6 having the compositions as shown in Table 3 were obtained.

content of 34% were added 49.8 parts (solid content: 27.4 parts) of a pigment-dispersed paste having a solid content of 55% and 293.2 parts of deionized water, whereby a cationic electro-deposition coating No. 1 having a solid content of 20% was obtained.

Examples 2 to 4, & Comparative Examples 1 and 2

Cationic electro-deposition coatings Nos. 2 to 6 having the compositions as shown in Table 4 were prepared. Tests were conducted on them under the below-described conditions and the results are also shown in Table 4.

Preparation of a Test Plate

Electro-deposition coating of a 0.8×150×70 mm cold-rolled dull-finish steel sheet or galvanized steel sheet, each

TABLE 3

| | Emulsion | Prep. Ex. 11 No. 1 | Prep. Ex. 12 No. 2 | Prep. Ex. 13 No. 3 | Prep. Ex. 14 No. 4 | Prep. Ex. 15 No. 5 | Prep. Ex. 16 No. 6 |
|---|---|---|---|---|---|---|---|
| | Composition of each emulsion | | | | | | |
| Resin (A) | 80% Amine-added epoxy resin A-1 | 37.5 (30) | | 25.0 (20) | | 37.5 (30) | |
| | 80% Amine-added epoxy resin A-2 | | 37.5 (30) | | 50 (40) | | 37.5 (30) |
| Resin (B) | 75% Amine-added acrylic resin No. 1 | 53.3 (40) | | | | | |
| | 75% Amine-added acrylic resin No. 2 | | 53.3 (40) | | 40 (30) | | |
| | 75% Amine-added acrylic resin No. 3 | | | 66.7 (50) | | | |
| | 75% Amine-added acrylic resin No. 4 | | | | | 53.3 (40) | |
| | 75% Amine-added acrylic resin No. 5 | | | | | | 53.3 (40) |
| Curing agent (C) | 90% curing agent No. 1 | 33.3 (30) | | 16.7 (15) | 16.7 (15) | 16.7 (15) | 16.7 (15) |
| | 90% curing agent No. 2 | | 33.3 (30) | 16.7 (15) | 16.7 (15) | 16.7 (15) | 16.7 (15) |
| Deionized water | | 161.7 | 161.7 | 160.7 | 162.4 | 161.6 | 161.6 |
| 34% Emulsion | | 294 (100) | 294 (100) | 294 (100) | 294 (100) | 294 (100) | 294 (100) |
| Difference in SP value between Resin (A) and Resin (B) | | 0.3 | 0.2 | 0.5 | 0.2 | 1 | 0.8 |

Preparation Example 17

Preparation of Pigment-dispersed Paste

A pigment-dispersed paste having a solid content of 55.0% was obtained by mixing 5.83 parts (solid content: 3.5 parts) of a quaternary ammonium salt type epoxy resin having a solid content of 60%, 14.5 parts of titanium white, 0.4 part of carbon black, 7.0 parts of a body pigment, 2.0 parts of bismuth hydroxide and 2.24 parts of deionized water.

EXAMPLES AND COMPARATIVE EXAMPLES

Example 1

Preparation of Cationic Electro-deposition Coating No. 1

To 294 parts (solid content: 100 parts) of the cationic electro-deposition coating emulsion No. 1 having a solid chemically treated with "Palbond #3020" (trade name of a zinc phosphate treating agent; product of Nihon Parkerizing Co., Ltd.) was performed in each of the cationic electro-deposition coating compositions obtained in the above-described Examples and Comparative Examples. The resulting test plate was then baked at 170° C. for 20 minutes by using an electric hot air drier. The plate thus obtained was tested under the below-described conditions. The results of the test are shown in Table 4.

In the corrosion resistance test (Note 7) using a galvanized steel sheet, a deterioration in the corrosion resistance is presumed to occur because a stress appears between the separated layers of the film and swelling (in the strain form) tends to be formed easily.

TABLE 4

Compositions and test results of cationic electro-deposition coating compositions

| Cationic electro-deposition coating composition | | Ex.1 No. 1 | Ex.2 No. 2 | Ex.3 No. 3 | Ex.4 No. 4 | Comp. Ex.1 No. 5 | Comp. Ex.2 No. 6 | |
|---|---|---|---|---|---|---|---|---|
| Composition of the coating | Emulsion No. 1 | 294 | | | | | | |
| | Emulsion No. 2 | | 294 | | | | | |
| | Emulsion No. 3 | | | 294 | | | | |
| | Emulsion No. 4 | | | | 294 | | | |
| | Emulsion No. 5 | | | | | 294 | | |
| | Emulsion No. 6 | | | | | | 294 | |
| | Pigment paste | 49.8 | 49.8 | 49.8 | 49.8 | 49.8 | 49.8 | |
| | Deionized water | 293.2 | 293.2 | 293.2 | 293.2 | 293.2 | 293.2 | |
| | 20% Bath | 637 | 637 | 637 | 637 | 637 | 637 | |
| Difference in the SP value between Resins (A) and (B) | | 0.3 | 0.2 | 0.5 | 0.2 | 1.0 | 0.8 | |
| Test results | Weatherability (Note 6) | 91 | 92 | 93 | 92 | 89 | 85 | Percent retention % |
| | Corrosion resistance (Note 7) | 2.6 | 2.5 | 2.7 | 2.6 | 3.8 | 3.5 | Rust width mm |
| | Ultrafilterability (Note 8) | A | A | A | A | C | B | Recovery rate |
| | Adhesion (Note 9) | A | A | A | A | C | B | Crosscut remaining ratio |
| | Stability 1 of coatings (Note 10) | A | A | A | A | C | B | Residue after filtration |
| | Stability 2 of coatings (Note 11) | A | A | A | A | C | C | Coating finish |

(Note 6)
Weatherability: After a test plate (a chemically-treated cold-rolled steel plate) was exposed to a 200-hour accelerated weathering test using a sunshine weatherometer, its gloss retention percentage was studied in accordance with 60° gloss of JIS K-5400 7.6 (1990).
(Note 7)
Corrosion Resistance: Cross-cuts were made with a knife through an electrodeposited film of each electrodeposited test plate (chemically-treated galvanized steel plate) to a base material. The resulting plate was subjected to a salt spray exposure test for 840 hours in accordance with JIS Z-2371 and lengths of the rust and blister starting from the knife cut were measured to evaluate corrosion resistance.
(Note 8)
Ultrafilterability: A zinc phosphate treating liquid (5000 ppm) was added to a cationic electro-deposition coating composition through an UF membrane "NTU-212" (trade name of UF flat membrane; product of Nitto Denko Corporation) for laboratory test. During the circulation of the coating composition by using an apparatus as illustrated in FIG. 1, the cationic electro-deposition coating composition is stressfully applied onto the UF film to test a recovery ratio (permeation amount) of the filtrate liquid. Referring to FIG. 1, a motor pump 1 is used to circulate a coating composition from a cationic electro-deposition bath 3 through a container 2, which has an UF membrane placed therein, to the bath 3. The coating composition is fed in the direction shown as an arrow 4 from the cationic electro-deposition bath 3 into the container 2 by the motor pump 1. In the container 2, coating composition is separated by means of the UF film into the filtrate liquid and residue. The residue is returned into the cationic electro-deposition bath 3 through the channel in a direction shown with an arrow 5. The amount of the filtrate liquid is measured at the channel shown in the flowing direction with an arrow 6. The filtrate liquid is then returned to the bath 3.
A: a recovery ratio exceeding 85%.
B: a recovery ratio of 75 to 85%.
C: a recovery ratio less than 75%.
(Note 9)
Adhesion: A test plate (a chemically treated galvanized steel sheet) was prepared by electro-deposition of each cationic electro-deposition coating composition thereon, followed by baking to cure. It was allowed to stand for 240 hours in a 50° C. blister box. On the resulting plate, a 2 mm crosshatch pattern was scribed and a peeling test was conducted using a Cellophane adhesive tape.
A: no problems
B: 95 to 99/100 remained.
C: less than 95/100 remained.
(Note 10)
Stability of a coating 1: The remaining amount of the paint after the above-described U/F ability test was measured.
A: less than 10 ml/L
B: 10 to 20 mg/L
C: exceeding 20 mg/L
(Note 11)
Stability of a coating 2: After the above-described U/F ability test, electro-deposition was conducted using the cationic electro-deposition coating composition and its coating finish was evaluated.
A: good with no problems.
B: surface roughening and lowering in glaze due to skin absorption are observed.
C: severe surface roughening and lowering in glaze due to skin absorption.

A cationic electro-deposition coating composition caple of forming a film good in both weatherability and corrosion resistance and being excellent in adhesion and moisture resistance, and moreover, long-term stability of the coating can be obtained by incorporating therein the cationic resin composition of the present invention comprising an amino-containing epoxy resin (A), an amino-containing acrylic resin (B) and a blocked polyisocyanate curing agent (C) in amounts of 5 to 80 wt %, 5 to 80 wt % and 10 to 'wt %, respectively, each based on the total weight of the solid content; and having a difference in solubility parameter between the amino-containing epoxy resin (A) and the amino-containing acrylic resin (B) ranging from 0 to 0.7 can provide a film having good weatherability and corrosion resistance.

Since the kind of monomers constituting the resin (B) and their mixing ratio are specified to allow an emulsion containing the resin (B) to have many hydroxyl groups, when a coating containing such a resin (B) is precipitated on the interface of a steel plate, adhesion starts from this point and the coating contributes to an improvement of corrosion resistance.

Furthermore, by specifying the kind of monomers constituting the resin (B) and their mixing ratio, weatherability is improved, because, in an emulsion formed of shell (base resin) and core (curing agent), an amine-added acrylic resin (B) is formed in the outer layer of the shell and an amine-added epoxy resin (A) is formed inside of the shell.

A difference in the solubility parameter within a range of from 0 to 0.7 provides the coating with good stability without causing destruction of emulsion particles even if a stress is applied to the coating for a long period of time.

The disclosure of Japanese Patent Application Nos. 2002-44315 filed on Feb. 21, 2002 and 2002-347557 filed on Nov. 29, 2002 including specification, drawings and claims is incorporated herein by reference in its entirety.

Although only some exemplary embodiments of this invention have been described in detail above, those skilled in the art will readily appreciated that many modifications are possible in the exemplary embodiments without materially departing from the novel teachings and advantages of this invention. Accordingly, all such modifications are intended to be included within the scope of this invention.

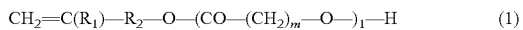

What is claimed is:

1. A cationic electro-deposition coating composition, which comprises:

component (A): an amino-containing epoxy resin (A) obtained by adding an amino-containing compound (a-2) to an epoxy resin (a-1) having an epoxy equivalent of from 400 to 3000, component (B): an amino-containing acrylic resin (B) obtained by adding an amino-containing compound (b-4) to a copolymer resin obtained by radical copolymerization of, as essential components, a polylactone-modified hydroxyl-containing radical copolymerizable monomer (b-1), which is obtained by adding a lactone to a hydroxyl-containing acrylic monomer (b) and is represented by the following formula (1) or (2):

$$CH_2=C(R_1)-R_2-O-(CO-(CH_2)_m-O-)_l-H \quad (1)$$

(wherein, $R_1$ represents H or an alkyl group, $R_2$ represents any one of $-(CH_2)_n-$, $-(CO)O-(CH_2)_n-$ and $-O-(CO)-(CH_2)_n-$, l stands for an integer of 3 to 10, m stands for an integer of 4 to 8 and n stands for an integer of 1 to 10),

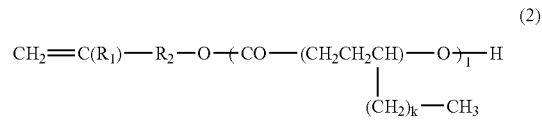

(wherein, $R_1$ represents H or an alkyl group, $R_2$ represents any one of $-(CH_2)_n-$, $-(CO)O-(CH_2)_n-$ and $-O-(CO)-(CH_2)_{n-1}$ stands for an integer of 3 to 10, k stands for an integer of 0 to 4 and n stands for an integer of 1 to 10), and glycidyl (meth)acrylate (b-2), and another radical copolymerizable monomer (b-3); and component (C): a blocked polyisocyanate curing agent (C) as a curing component, the component (A), component (B) and component (C) being added in amounts of 5 to 80 wt %, 5 to 80 wt % and 10 to 40 wt %, respectively, based on the total solid content of the components (A), (B) and (C);

wherein the amino-containing acrylic resin (B) is obtained by adding the amino-containing compound (b-4) to a resin obtained by radical copolymerization reaction of a mixture of 5 to 40 wt % of the polylactone-modified hydroxyl-containing radical copolymerizable acrylic monomer (b-1), which is obtained by adding a lactone to hydroxyethyl (meth)acrylate and is represented by the formula (1) or (2), 2 to 30 wt % of glycidyl (meth)acrylate and 30 to 93 wt % of another radical copolymerizable monomer (b-3), each based on the total solid content of the monomers constituting the amino-containing acrylic resin (B).

2. The cationic electro-deposition coating composition of claim 1, wherein the lactone is ε-caprolactone.

3. The cationic electro-deposition coating composition of claim 1, wherein the amino-containing epoxy resin (A) has an amine value ranging from 40 to 80 mg KOH/g.

4. The cationic electro-deposition coating composition of claim 1, wherein the amino-containing epoxy resin (A) has a primary hydroxyl value ranging from 10 to 200 mg KOH/g.

5. The cationic electro-deposition coating composition of claim 1, wherein the amino-containing epoxy resin (A) has a number-average molecular weight of from 500 to 5000.

6. The cationic electro-deposition coating composition of claim 1, wherein the amino-containing epoxy resin (A) has a solubility parameter $\delta_A$ of from 9.5 to 11.5.

7. The cationic electro-deposition coating composition of claim 1, wherein the amino-containing acrylic resin (B) has a hydroxyl value of from 10 to 300 mg KOH/g.

8. The cationic electro-deposition coating composition of claim 1, wherein the amino-containing acrylic resin (B) has an amine value of from 10 to 125 mg KOH/g.

9. The cationic electro-deposition coating composition of claim 1, wherein the amino-containing acrylic resin (B) has a number-average molecular weight of from 10000 to 50000.

10. The cationic electro-deposition coating composition of claim 1, wherein the amino-containing acrylic resin (B) has a solubility parameter $\delta_A$ of from 9.5 to 11.5.

11. The cationic electro-deposition coating composition of claim 1, wherein the blocked polyisocyanate curing agent (C) is composed of at least one aromatic isocyanate and at least one aliphatic or alicyclic isocyanate.

12. The cationic electro-deposition coating composition of claim 1, wherein a difference in solubility parameter $\delta_A$ between the amino-containing epoxy resin (A) and amino-containing acrylic resin (B) ranges from 0 to 0.7.

13. The cationic electro-deposition coating composition of claim 1, further comprising 0.01 to 10 wt % of a bismuth compound based on 100 wt % of the solid content of said composition.